(12) United States Patent
Miyashita et al.

(10) Patent No.: US 6,473,466 B1
(45) Date of Patent: Oct. 29, 2002

(54) DATA TRANSMITTING METHOD AND DATA TRANSMITTING APPARATUS ACCOMPANIED WITH A PLURALITY OF TRANSMITTING OF RECEIVING ANTENNAS

(75) Inventors: Atsushi Miyashita, Tokorozawa; Seiichi Sano, Higashiyamato; Toshiyuki Akiyama, Tokorozawa; Nobuo Tsukamoto, Akishima; Tatuhiro Nakada, Kodaira, all of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/206,406

(22) Filed: Dec. 7, 1998

(30) Foreign Application Priority Data

Dec. 8, 1997 (JP) .............................................. 9-337242

(51) Int. Cl.7 ................................................ H04B 7/20
(52) U.S. Cl. ....................................... 375/267; 455/562
(58) Field of Search .............................. 375/261, 298, 375/316, 344, 295, 267, 347; 455/132–136, 103, 562, 277.1, 96, 98, 101; 342/82, 89, 74, 79; 370/343

(56) References Cited

U.S. PATENT DOCUMENTS

| | | | | |
|---|---|---|---|---|
| 5,812,935 A | * | 9/1998 | Kay ........................... | 455/56.1 |
| 6,018,659 A | * | 1/2000 | Ayyagari et al. ............ | 455/431 |
| 6,038,448 A | * | 3/2000 | Chheda et al. .............. | 455/436 |
| 6,119,018 A | * | 9/2000 | Kondo ........................ | 455/522 |
| 6,141,542 A | * | 10/2000 | Kotzin et al. ............... | 455/101 |

\* cited by examiner

*Primary Examiner*—Chi Pham
*Assistant Examiner*—Dung X. Nguyen
(74) *Attorney, Agent, or Firm*—Antonelli, Terry, Stout & Kraus, LLP

(57) ABSTRACT

A data transmitting apparatus in which in an antenna switching of the data transmitting apparatus, a sudden change of transmission path characteristics is prevented and a state where an automatic equalizing function on the reception side can follow can be held. The apparatus has a processing circuit for gradually switching antennas of the data transmitting apparatus with respect to the time and for continuously switching one antenna from the rated level to the 0 level and for continuously switching the other antenna from the 0 level to the rated level. The apparatus operates so as to always keep the optimum constellation state in which the automatic equalizing process follows.

24 Claims, 8 Drawing Sheets

DATA TRANSMITTING METHOD AND DATA TRANSMITTING APPARATUS ACCOMPANIED WITH A PLURALITY OF TRANSMITTING OF RECEIVING ANTENNAS

BACKGROUND OF THE INVENTION

The invention relates to a digital transmitting method and a digital transmitting apparatus and, more particularly, to a digital transmitting method and a digital transmitting apparatus for switching a plurality of transmitting or receiving antennas and transmitting and receiving a digital signal.

In recent years, a QAM (Quadrature Amplitude Modulation) transmitting system in which a digital process is applied to modulating and demodulating processes has been proposed.

In such a transmitting system, information data of, for example, 81 Mbps to be transmitted is transmitted from the transmission side at a rate of 13.5 Mega symbols/sec. namely, every about 74 nsec as symbol data of 64 values (64 points) constructed by binding on a 6-bit unit basis.

On the reception side, an equalizing process for changing filter characteristics of a demodulating unit on the reception side is executed so as to optimize an instantaneous data level to be discriminated from the data which reaches every about 74 nsec. The level of the received data is discriminated, thereby reconstructing the 6-bit data.

As mentioned above, in the QAM modulation and demodulation transmitting apparatus, it is indispensable to install the equalization processing function to change a frequency and phase characteristics on the reception side.

As for the equalizing process, for instance, refer to John G. Proakis, "DIGITAL COMMUNICATIONS", the third edition, McGraw-Hill, Inc., pp. 620–653, 1995.

SUMMARY OF THE INVENTION

In the case of a transmitting apparatus as mentioned above, even if the apparatus is used in a state where the positions on the transmission side and reception side are fixed, an environmental situation in which a reflection wave is produced gradually changes due to the rain or the like.

To make it possible to follow such a change, a transmitting apparatus with an automatic equalizing function for re-setting the foregoing equalizing process in the more suitable direction in accordance with the characteristics or demodulating state of the reception data is necessary.

FIG. 9 shows a construction of a reception demodulating unit having an automatic equalizing function and it will be briefly explained. After a reception input is inputted to a variable filter 6-1 of the reception demodulating unit, a discriminator 6-2 discriminates on the basis of the level and the phase of the reception input that the reception input is data having a value closer to one of the signal points in the digital data on the transmission side.

An error detection corrector 6-3 compares levels and phases between output data of the variable filter 6-1 and the discrimination data, thereby detecting errors between them. The error detection corrector 6-3 generates a filter control signal to change filter characteristics of the variable filter 6-1 so as to reduce the errors.

FIG. 10A shows an arrangement of the signal points of the digital data on the transmission side. FIG. 10B shows the level and phase of received data before discrimination on the reception side, data after discrimination, and detected errors.

In the case where frequency characteristics are not flat on a transmission path such as, for example, the level in a high band is attenuated and a signal of a low frequency component pattern is transmitted such that the same data is continuously transmitted for a period of time of two symbols or longer and, after that, it is changed to another data, the amplitude of the data can be relatively correctly transmitted. In case of a data pattern having a lot of high band components in which data changes every symbol, however, the high band components are attenuated and the amplitude level of the data drops.

The error detection corrector 6-3 detects the errors in such a case and integrates the errors, thereby suppressing a variation in detected errors due to noises. After that, the corrector 6-3 controls so as to raise high band characteristics of the variable filter 6-1.

Thus, the automatic equalization processing function as mentioned above can cope with the gentle change in the state of the transmission path which is caused when the transmitting and receiving positions are moved, the QAM transmitting system can be used in applications which are not limited to transmission and reception at fixed positions.

A specific use example of a transmitting apparatus which is not limited to the transmission and reception at fixed positions will now be described hereinbelow. In this system, a transmission side apparatus of the transmitting apparatus having an automatic equalizing function is installed in a helicopter and a receiving apparatus is arranged in a broadcasting station building serving as a reception side and is away from the transmitting apparatus by tens of kilometers.

The helicopter transmits image information picked up by a TV camera as a radio wave from a transmitting antenna equipped to a body of the helicopter while flying, namely, moving.

The broadcasting station building serving as a reception side receives the radio wave by a receiving antenna, demodulates it and uses the demodulated image information for a television broadcasting.

Since the transmitting antenna of the helicopter cannot be attached to the bottom surface of the body due to size limitation, two transmitting antennas are inevitably attached to two positions on the right and left sides of the helicopter body. Since the direction of the broadcasting station building serving as a reception point changes depending on the flying direction of the helicopter, that transmitting antenna on either one of the right and left sides which faces the broadcasting station building is selected and the image information is transmitted by the selected antenna. A transmitting apparatus of the type having a function for automatically selecting and switching the antennas in accordance with the flying direction of the helicopter is also conceivable.

Such an example is shown in FIG. 7 and the operation will now be briefly described.

A transmission side (helicopter) 10 consists of an image compressing unit ENC, a transmission modulating unit 1, a path switching unit 2, a switching control unit 3, and transmitting antennas 4-1 and 4-2.

Compression image information from the image compressing unit ENC is QAM modulated by the transmission modulating unit 1 and is fed to an input I of the path switching unit 2. An output of the switching control unit 3 is fed to an input C of the path switching unit 2. An output Oa of the path switching unit 2 is fed to the transmitting antenna 4-1 and an output Ob is fed to the transmitting antenna 4-2 and those outputs are transmitted as a transmission signal radio wave.

A reception side (broadcasting station building) 11 consists of a receiving antenna 5, a reception demodulating unit 6, and an image decompressing unit DEC. An output of the receiving antenna 5 is fed to the reception demodulating unit 6.

The switching control unit 3 of the transmission side 10 recognizes the positional relation between the flying direction of the helicopter and the reception side 11 on the basis of information from detecting means (not shown), discriminates a proper one of the transmitting antennas 4-1 and 4-2 which can face the receiving antenna 5, and generates a corresponding switching control signal to select the proper transmitting antenna.

Thus, the path switching unit 2 is selectively switched to either the output Oa or Ob connected to the transmitting antenna which faces the reception side 11 in response to the switching control signal from the switching control unit 3. The input data is outputted from only a corresponding one of the transmitting antennas.

Since the output of the transmission modulating unit 1 can be outputted up to only a predetermined level, if it is equally distributed to a plurality of antennas, the distance at which the transmission is possible becomes short. To solve such a drawback, the selective switching method as mentioned above may be used.

The radio wave transmitted from the transmitting antenna 4-1 or 4-2 passes through the air, reaches the receiving antenna 5, is restored to the compression image information by the reception demodulating unit 6, is decompressed by the image decompressing unit DEC, and after that, it is used as image information for a television broadcasting or the like.

As described with reference to FIGS. 10A and 10B, according to the foregoing automatic equalizing function, a QAM constellation (arrangement of the signal points) state obtained by mapping the data levels before the reception data is discriminated is statistically monitored and the frequency characteristics and phase characteristics of the filter built in the reception demodulating unit on the reception side are gradually changed so as to reduce errors from the inherent constellation position.

That is, whether a demodulation QAM constellation state of the reception data is good or not cannot be momentarily discriminated from a small number of symbol data and an accurate statistic cannot be derived unless the constellation states collected over a certain extent of time, for instance, on the order of hundreds of usec are examined.

Explanation will now be made with respect to the foregoing case of the use in the helicopter or the like with reference to FIG. 8. First, it is assumed that the witching control signal of the output of a switching control unit 3 changed at time t0. In response, the path switching unit 2 switches the input I from the output Oa to the output Ob, thereby causing the output of the transmitting antenna 4-1 to almost instantaneously change from a rated value to 0 and, at the same time, causing the output of the transmitting antenna 4-2 to instantaneously change from 0 to the rated value.

Since the transmitting antenna which is used is instantaneously switched from 4-1 to 4-2 as mentioned above, the transmitting position suddenly changes which in turn causes a fading state on the reception side 11 to be suddenly changed. Consequently, the equalizing characteristics which have been in the state where they are optimum for transmission by the transmitting antenna 4-1 so far by the automatic equalizing function become improper.

That is, the constellation state is disordered after a time point near time t0 due to the improper equalization.

To prevent such a situation, the statistic process is again executed from the disordered constellation state and the demodulation of the transmission signal is executed in an improper state for a period of time until the proper equalizing characteristics are obtained, in this example, until time t1, so that transmitted compression image information cannot be correctly received.

Thus, the normal transmission is obstructed until time t1 as a result of the switching of the transmitting antennas which is performed at time t0.

SUMMARY OF THE INVENTION

It is an object of the invention to provide a data transmitting method and a data transmitting apparatus which can eliminate the foregoing drawbacks and can prevent a sudden change in characteristics on a transmission path in an antenna switching in a data transmitting apparatus and can keep a state where an automatic equalizing function on the reception side can follow a change in transmission path characteristics.

To accomplish the above object, according to one aspect of the invention, there is provided a data transmitting apparatus for transmitting and receiving information data which is digitally modulated, wherein the data transmitting apparatus operates so as to select an appropriate transmitting antenna from a plurality of transmitting antennas in accordance with a state change of a transmission path, to switch to the selected transmitting antenna, and to transmit the information data, and a soft switching control is executed in a manner such that in case of selecting and switching the transmitting antenna, a transmitting level is gently or continuously shifted from the transmitting antenna before the switching to the transmitting antenna after the switching for or over a predetermined time.

According to another aspect of the invention, there is provided a data transmitting apparatus for transmitting and receiving information data which is digitally modulated, wherein the data transmitting apparatus operates so as to select an appropriate receiving antenna from a plurality of receiving antennas in accordance with a state change of a transmission path, to switch to the selected receiving antenna, and to receive the information data, and a soft switching control of the receiving antenna is executed when selecting and switching the receiving antenna such that a supply of a reception signal to a reception demodulating unit is switched from the receiving antenna before the switching to the receiving antenna after the switching in a manner such that a receiving level is gently or continuously shifted for or over a predetermined time.

According to still another aspect of the invention, there is provided a data transmitting apparatus for transmitting and receiving information data which is digitally modulated, wherein the data transmitting apparatus operates so as to select an appropriate transmitting antenna from a plurality of transmitting antennas in accordance with a state change of a transmission path, to switch to the selected transmitting antenna and to transmit the information data and operates so as to select an appropriate receiving antenna from a plurality of receiving antennas in accordance with a state change of a transmission path, to switch to the selected receiving antenna, and to receive the information data, a soft switching control is executed in a manner such that when selecting and switching the transmitting antenna, a transmitting level is gently or continuously shifted from the transmitting antenna before the switching to the transmitting antenna after the switching over a predetermined time, and when selecting and switching the receiving antenna a soft switching control of the receiving antenna is executed such that a supply of a reception signal to a reception demodulating unit is switched from the receiving antenna before the switching to the receiving antenna after the switching in a manner such that a receiving level is gently or continuously shifted for or over a predetermined time.

DETAILED DESCRIPTION OF THE PREFERRED EMBODIMENTS

Figure 1:
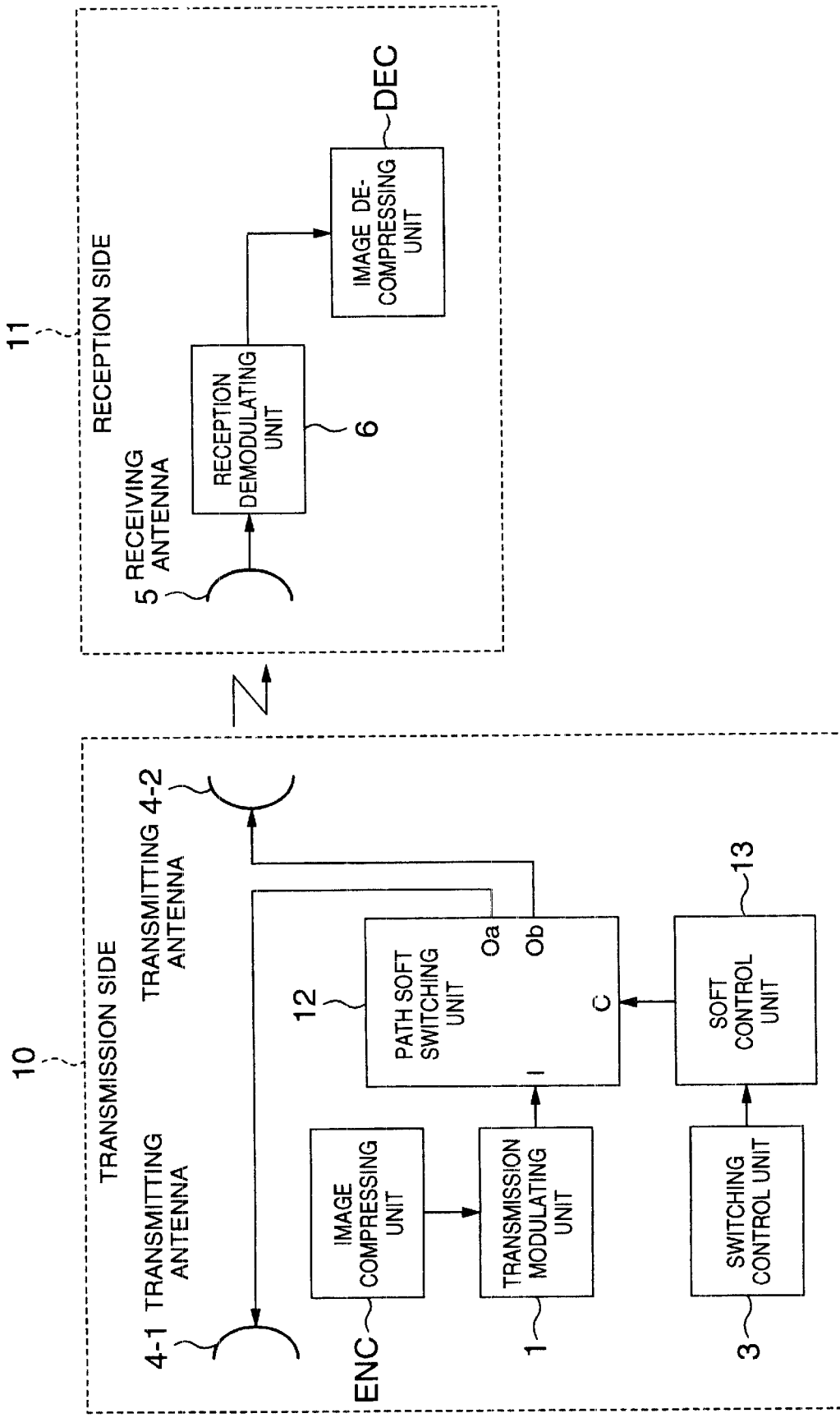
FIG. 1 is a block diagram showing a whole construction of a data transmitting apparatus according to an embodiment of the invention.

FIG. 1 shows a block construction of an embodiment of the invention and its operation will now be described.

The transmission side (helicopter) 10 is made up of the image compressing unit ENC, the transmission modulating unit 1, a continuous variable path switching unit (path soft switching unit) 12, the switching control unit 3, a continuous variable control unit (soft control unit) 13, and the transmitting antennas 4-1 and 4-2.

Compression image information from the image compressing unit ENC is QAM modulated by the transmission modulating unit 1. An output of the transmission modulating unit 1 is fed to an input I of the path soft switching unit 12. A control signal for switching the antennas from the switching control unit 3 is inputted to the soft control unit 13. An output of the soft control unit 13 is connected to an input C of the path soft switching unit 12.

An output Oa of the path soft switching unit 12 is fed to the transmitting antenna 4-1 and the other output Ob is connected to the transmitting antenna 4-2.

The reception side (broadcasting station premises side) 11 is made up of the receiving antenna 5, reception demodulating unit 6, and image decompressing unit DEC. An output of the receiving antenna 5 is connected to the reception demodulating unit 6.

The switching control unit 3 of the transmission side 10 recognizes the positional relation between the flying direction of the helicopter and the reception side 11 on the basis of information from a detector (not shown), discriminates a proper one of the transmitting antennas 4-1 and 4-2 which can face the receiving antenna 5, and generates a corresponding switching control signal to select the proper transmitting antenna.

The positional relation detector will be briefly explained assuming, for example, that a flying helicopter is a transmission side and a relaying station which constitutes a reception side is geographically fixed. The position of the helicopter itself can be calculated using a GPS (Global Positioning System) which operates using radio waves from satellites. Using the position of the helicopter thus obtained, the direction of the receiving side can be easily calculated. However, to obtain the direction of the helicopter, it is required for the helicopter to be equipped with a mechanical gyroscope as the direction can not be obtained from the GPS. With these two information, namely, the direction of the receiving side and the direction of the helicopter, it becomes possible to select the most optimal one of the antennas installed on the helicopter and orient it to the receiving side.

When the control signal for switching the antennas from the switching control unit 3 changes, the soft control unit 13 generates a control signal whose level gradually changes with the elapse of time.

The path soft switching unit 12 executes the operation to distribute a transmission signal that is supplied to the input terminal I to the output terminals Oa and Ob in accordance with the level of the control signal from the soft control unit 13 which is inputted to the control terminal C in a manner such that their levels are inversely proportional to each other.

Figure 2:
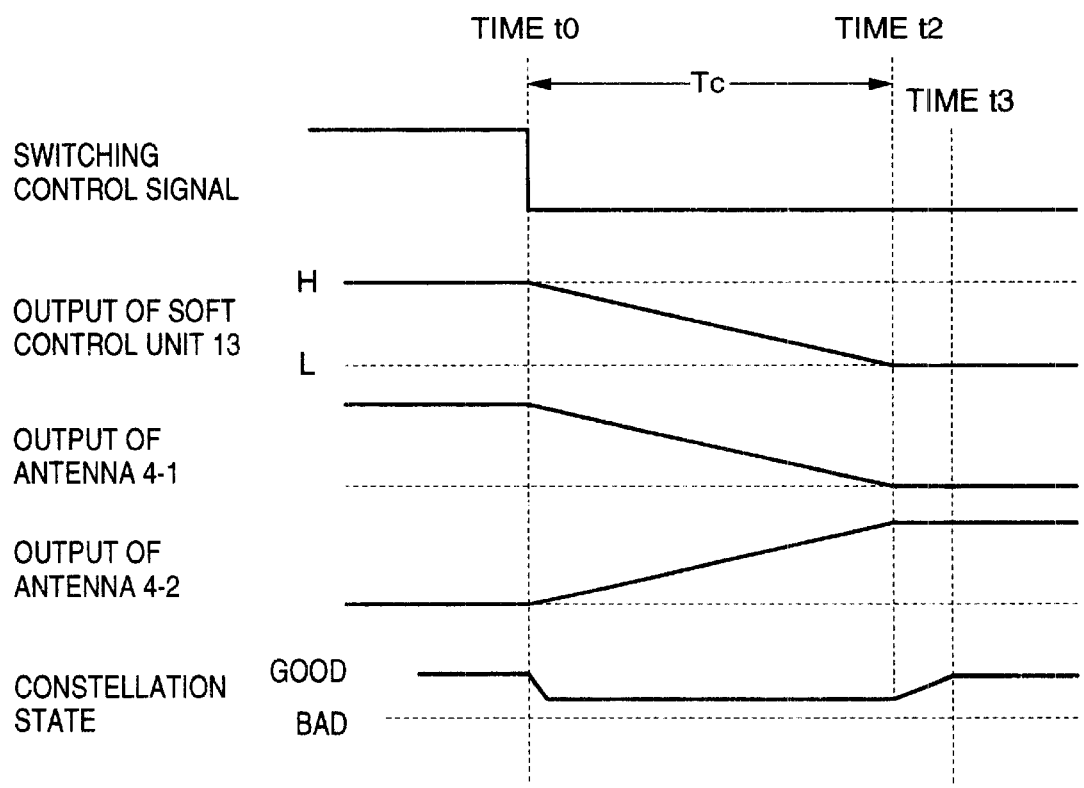
FIG. 2 is a time chart useful for explanation of the relation between the level and the time upon switching of antennas of the invention.

An operating situation in each section will now be described hereinbelow with reference to a time chart of FIG. 2.

First, it is assumed that the switching control signal as an output of the switching control unit 3 changes at time t0. Subsequently, the output level of the soft control unit 13 gradually decreases from the then "H" level toward the "L" level over a time Tc.

In accordance with the control signal from the soft control unit 13, the output of the output terminal Oa of the path soft switching unit 12, namely, the output of the transmitting antenna 4-1 also gradually decreases from the rated level at time t0.

On the other hand, the output of the output terminal Ob of the path soft switching unit 12, namely, the output of the transmitting antenna 4-2 gradually rises from the "0" level at time t0.

The output of the transmitting antenna 4-1 decreases to the "0" level at time t2 after the elapse of time Tc and the output of the other transmitting antenna 4-2 rises to the rated level.

An effect in case of gradually switching instead of instantaneously performing the switching of the transmitting antennas will now be described hereinbelow with reference to FIG. 11. When the switching operation is started at time t0, a reflection wave whose level is very low is generated from the other antenna. Since the switching of the antennas gradually progresses with the elapse of time, the level of the reflection wave gradually increases. This state is substantially the same as a change in transmission environment involving no antenna switching.

Figure 11:
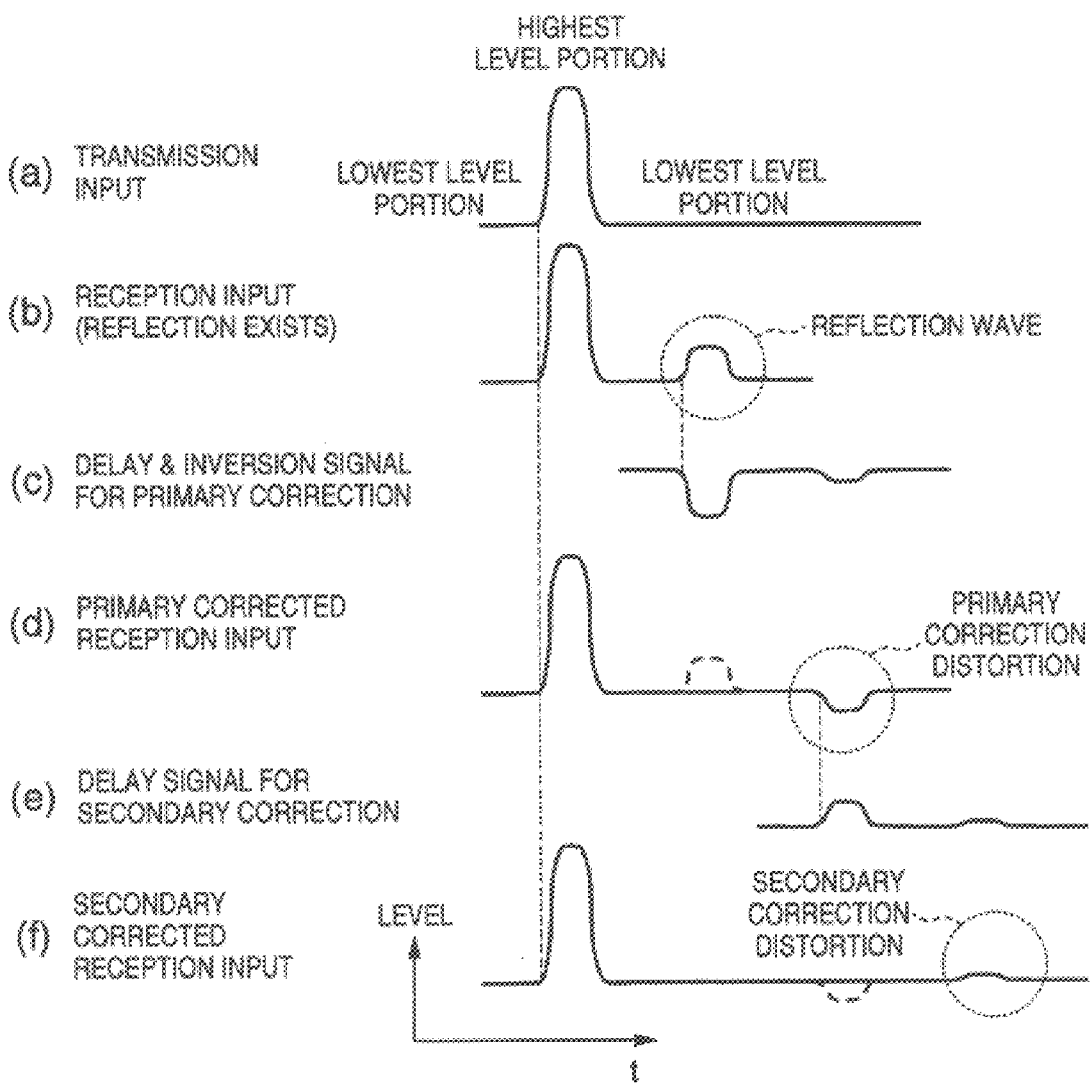
FIG. 11 is a waveform diagram useful for explanation of an influence in the case where the switching of transmitting antennas is gradually performed.

FIG. 11 is a waveform diagram showing an outline of an equalizing process when the reflection wave is mixed. It is assumed for simplification, that the signal is such that the lowest level continues before and after the highest level with respect to the time. A waveform of the foregoing transmission output is shown in a waveform (a).

At a transition of the reflection wave or antenna switching, as shown in a waveform (b), the highest level portion is delayed and added. A process for removing the delayed highest level portion will now be described. A waveform (c) for primary correction in which the waveform (b) is delayed and inverted so as to coincide the level with that of the reflection wave is formed. The waveform (c) is added to the waveform (b). As a result, the reflecting portion existing in the waveform (b) is cancelled and a waveform (d) is obtained. However, a primary correction distortion as a new dent is generated in the waveform (d) by an error as much as the reflection wave included in the waveform (c) for correction. To cope with this, a waveform (e) for secondary correction is formed and added to the waveform (d), thereby obtaining a waveform (f). The primary correction distortion is cancelled. However, a secondary correction distortion is further caused in the waveform (f). By performing such a correction a couple of times, the final correction distortion can be reduced to an ignorable level. The above-mentioned processes are executed in the variable filter 6-1.

As mentioned above, the automatic equalizing process is a process for detecting a statistic deviation of the constellation and changing the frequency characteristics and phase characteristics so as to reduce such a deviation.

Therefore, if a characteristics change per time of the transmission path which is caused by the switching of the transmitting antennas is gentle, the deviation of the constellation is also slow with respect to the time and the automatic equalizing process can follow the fluctuation.

The transmitting antenna switching time is set to time longer than the time that is required for the automatic equalizing process. Specifically speaking, since the ordinary automatic equalizer can cope with the characteristics change of the transmission path of a period of about 0.5 second, the time within a range from the start of the transmitting antenna switching to the end of the switching is set to time on the order of second or longer.

Figure 3:
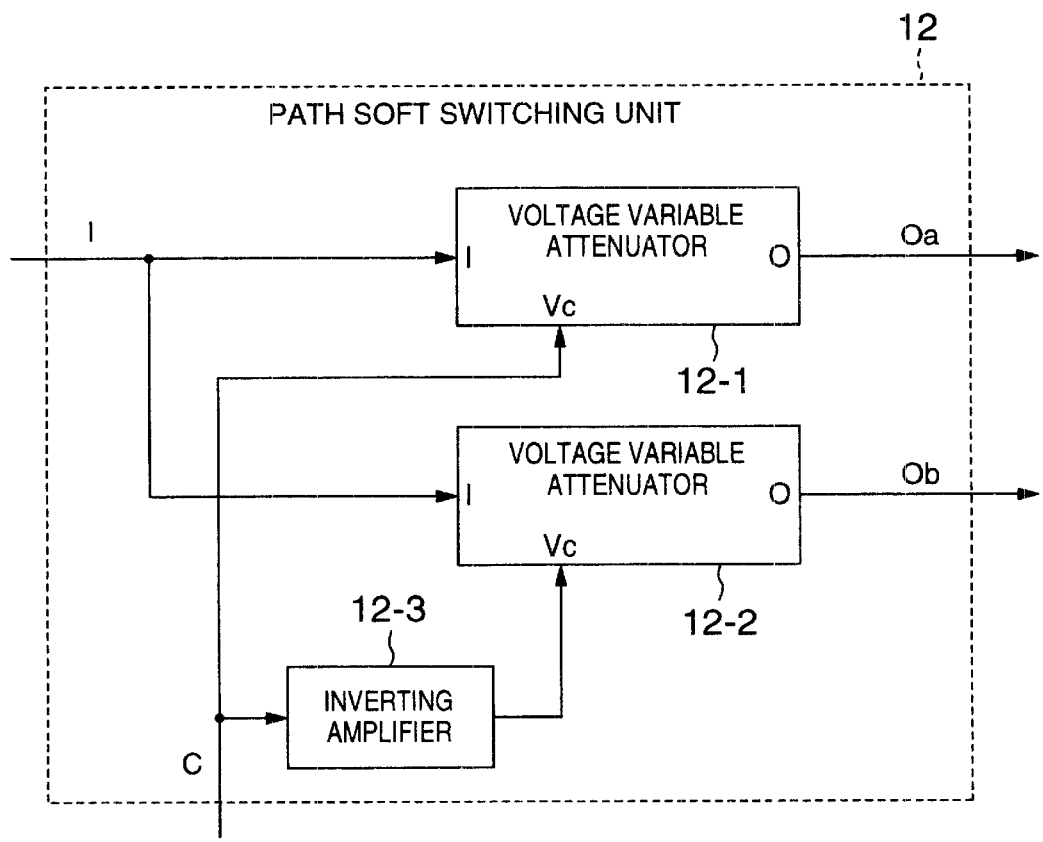
FIG. 3 is a block diagram showing a specific construction of a path soft switching unit in FIG. 1.

An example of a specific construction of the path soft switching unit 12 is shown in FIG. 3 and will be explained. The input terminal I to which the signal for transmission from the transmission modulating unit 1 in FIG. 1 is inputted is connected to input terminals I of two voltage variable attenuators 12-1 and 12-2. Outputs O of the voltage variable attenuators are connected to the output terminals Oa and Ob, respectively.

The control terminal C to which the control signal from the soft control unit 13 in FIG. 1 is inputted is connected to a terminal Vc of the voltage variable attenuator 12-1 and to an inverting amplifier 12-3. An output of the inverting amplifier 12-3 is connected to a terminal Vc of the voltage variable attenuator 12-2. Therefore, the voltage which is applied to the control terminal C is applied as it is to the Vc terminal of the voltage variable attenuator 12-1 on the terminal Oa side. On the other hand, the voltage which is applied to the control terminal C is inverted and applied to the Vc terminal of the voltage variable attenuator 12-2 on the terminal Ob side.

The voltage variable attenuators are ones that change, for example, an attenuation amount to 0 dB if the voltage at the terminal Vc is equal to 5V; to 6 dB if it is equal to 2.5V; and to an infinite value if it is equal to 0V. Thus, if the voltage at the control terminal C is equal to 5V, the attenuation amount of the voltage variable attenuator 12-1 is set to 0 dB and the attenuation amount of the voltage variable attenuator 12-2 is set to an infinite value. If the voltage at the control terminal C decreases to 2.5V, the attenuation amount of each voltage variable attenuator is equal to 6 dB.

Further, when the voltage at the control terminal C decreases and reaches 0V, the attenuation amount of the voltage variable attenuator 12-1 is equal to an infinite value and the attenuation amount of the voltage variable attenuator 12-2 is equal to 0 dB.

Figure 4:
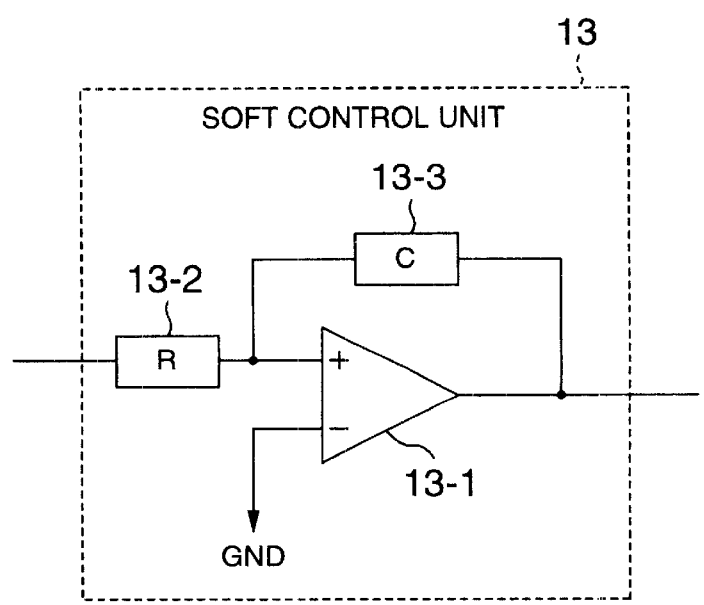
FIG. 4 is a block diagram showing a specific construction of a soft control unit for controlling a path soft switching unit in FIG. 3.

An example of a specific construction of the soft control unit 13 is shown in FIG. 4 and will now be described. The soft control unit 13 is an integrating circuit consisting of an operational amplifier 13-1, a capacitor 13-3, and a resistor 13-2, integrates the switching control signal which is inputted from the switching control unit 3 in FIG. 1, and outputs a control signal whose output level gradually decreases or increases as shown in FIG. 2.

Figure 5:
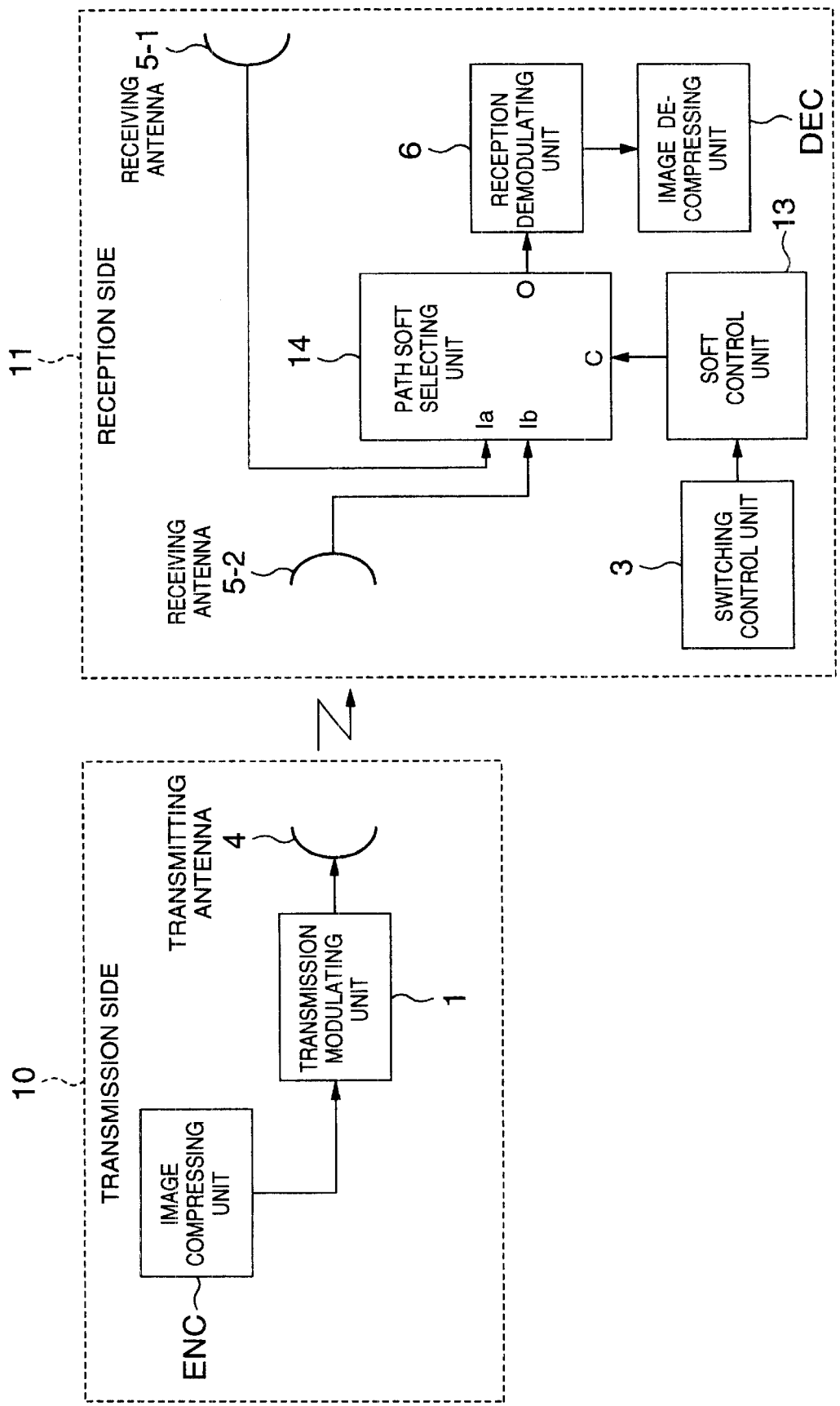
FIG. 5 is a block diagram showing a whole construction of a data transmitting apparatus according to the second embodiment of the invention.

Next, a case of switching the antennas on the reception side is shown in FIG. 5 and will be described as another embodiment of the invention.

The transmission side (helicopter) 10 is made up of the image compressing unit ENC, transmission modulating unit 1, and a transmitting antenna 4.

The compression image information from the image compressing unit ENC is QAM modulated by the transmission modulating unit 1 and an output of the transmission modulating unit 1 is fed to the transmitting antenna 4.

The reception side (broadcasting station premises side) 11 is made up of receiving antennas 5-1 and 5-2, a continuous variable path selecting unit (path soft selecting unit) 14, the reception demodulating unit 6, the image decompressing unit DEC, the switching control unit 3, and the continuous variable control unit (soft control unit) 13.

The switching control unit 3 on the reception side 11 recognizes the positional relation between the flying direction of the helicopter and the reception side 11 on the basis of information from detecting means (not shown), discriminates a proper one of the receiving antennas 5-1 and 5-2 which can face the transmitting antenna 4, and generates a corresponding switching control signal to select the proper receiving antenna.

The soft control unit 13 generates a control signal whose level gradually changes with the elapse of. time when the control signal for switching the antennas from the switching control unit 3 changes.

The path soft selecting unit 14 executes the operation for selecting the reception signals which are applied to input terminals Ia and Ib in accordance with the level of the control signal from the soft control unit 13 which is inputted to the control terminal C in a manner such that their levels are inversely proportional to each other and for outputting the selected reception signal to the output terminal O. The path soft selecting unit 14 can be constructed by substituting voltage variable amplifiers for the voltage variable attenuators 12-1 and 12-2 in the path soft switching unit 12 shown in FIG. 3.

As mentioned above, by gradually performing the antenna switching operation on the reception side, in a manner similar to the foregoing antenna switching on the transmission side, a characteristics change per time of the transmission path which is caused by the switching of the receiving antennas is gentle and the deviation of the constellation is also slow with respect to the time, so that the automatic equalizing process can follow the fluctuation.

Figure 6:
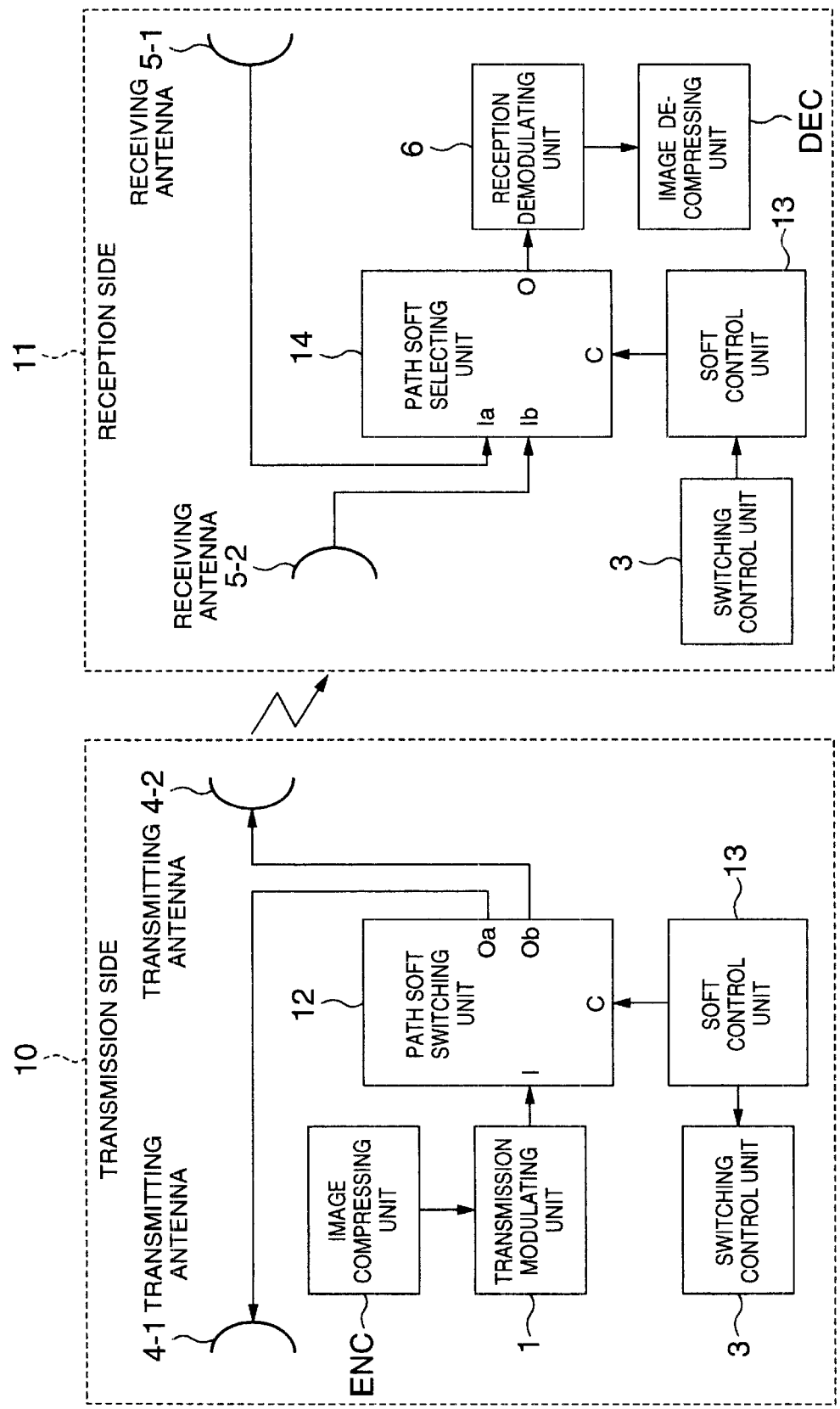
FIG. 6 is a block diagram showing a whole construction of a data transmitting apparatus according to the third embodiment of the invention.
Figure 7:
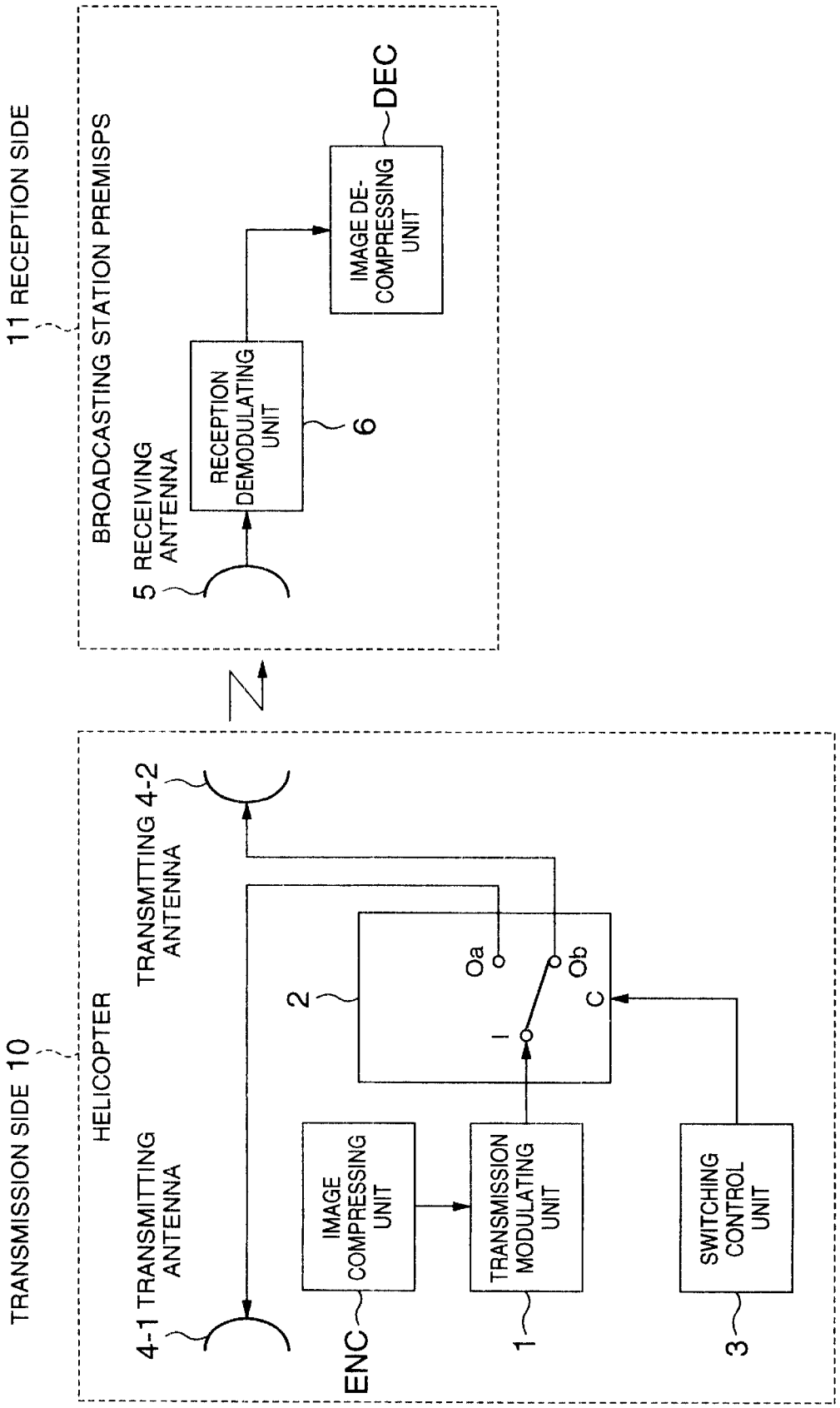
FIG. 7 is a block diagram showing a whole construction of a data transmitting apparatus.
Figure 8:
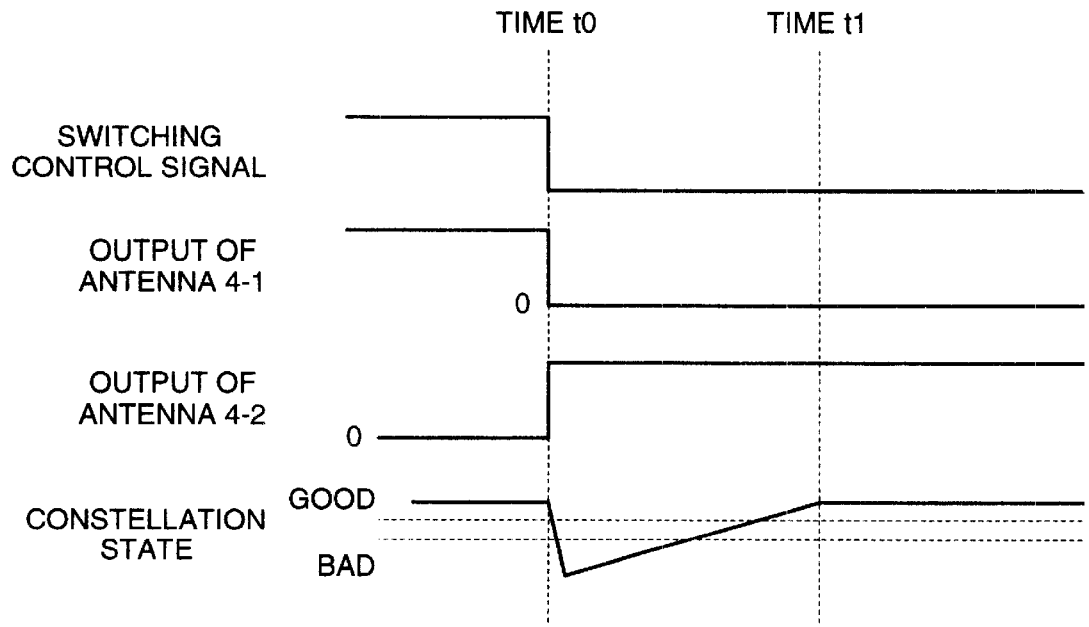
FIG. 8 is a time chart which is useful for explanation of a relation between the level and the time upon switching of the antennas.
Figure 9:
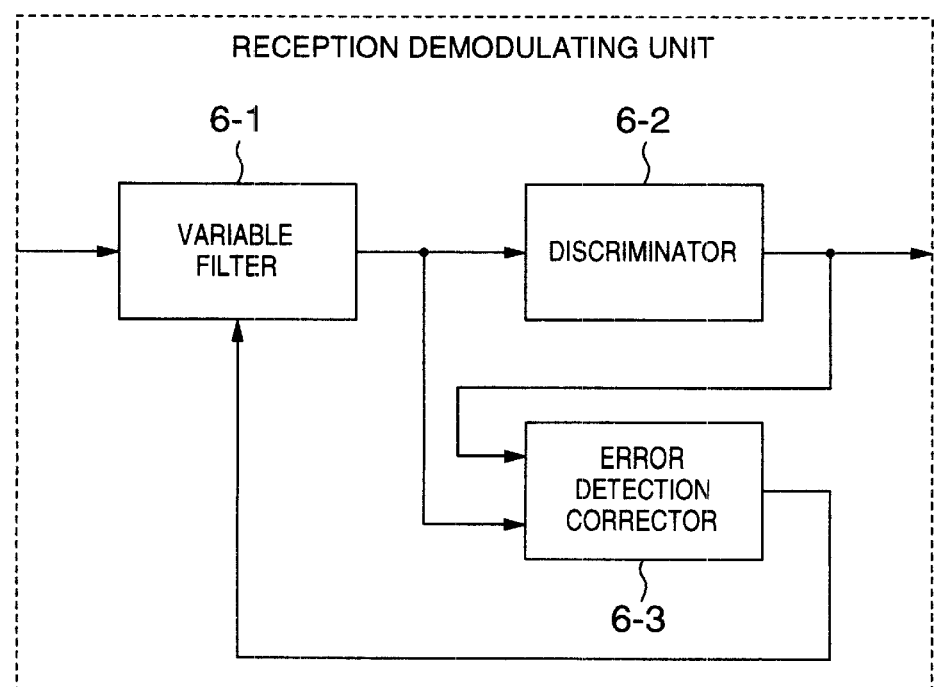
FIG. 9 is a block diagram showing a construction of a reception demodulating unit having an automatic equalizing function.
Figure 10A:
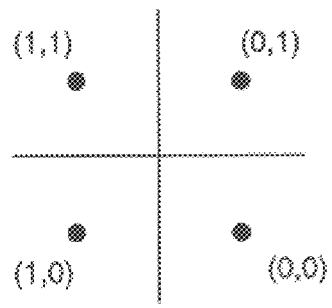
FIGS. 10A and 10B are schematic diagrams useful for explanation of an arrangement of signal points of digital data on the transmission side and the reception side.
Figure 10B:
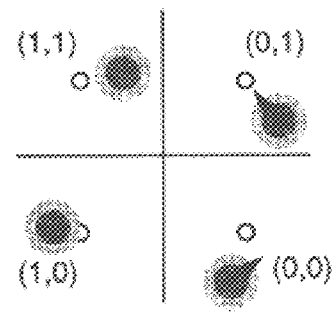

As another embodiment of the invention, a case where the switching operations of the antennas are gradually executed on the transmission side and the reception side is shown in FIG. 6. Since a construction and the operation in this embodiment are similar to those in FIGS. 1 and 5, their descriptions are omitted here.

Although the embodiments have been described with respect to the quadrature amplitude modulating system as an example, the invention can be also applied to the other modulating systems such as 8-VSB, multilevel-FM, and the like.

According to the invention as described above, since it is possible to limit the level change amount per time in the antenna switching, by setting the level change amount to a value that is equal to or smaller than the change amount with which the automatic equalization processing function can cope, a normal decoding state can be also maintained even in the data transmitting apparatus for performing the antenna switching.

What is claimed is:

1. A control method of a data transmitting apparatus for transmitting and receiving digitally modulated information data through a transmission path, comprising the steps of:
   supplying a transmission signal to one of a plurality of transmitting antennas and transmitting said transmission signal;
   selecting an appropriate one of said plurality of transmitting antennas in accordance with a state change of said transmission path during the transmission of said transmission signal; and
   soft-switching the transmitting antennas from said one transmitting antenna to said selected antenna so as to continuously shift a level of said transmission signal from said one transmitting antenna to said selected transmitting antenna over a predetermined time,
   wherein said data transmitting apparatus has a receiving apparatus including a reception demodulating unit with an automatic receiving-frequency-characteristics equalizing function, and said predetermined time is longer than the time that is necessary for processing said automatic equalizing function.

2. A control method of a data transmitting apparatus for transmitting and receiving digitally modulated information data through a transmission path, comprising the steps of:
   supplying a transmission signal to one of a plurality of transmitting antennas and transmitting said transmission signal;
   selecting an appropriate one of said plurality of transmitting antennas in accordance with a state change of said transmission path during the transmission of said transmission signal; and
   soft-switching the transmitting antennas from said one transmitting antenna to said selected antenna so as to continuously shift a level of said transmission signal from said one transmitting antenna to said selected transmitting antenna over a predetermined time,
   wherein said information data is modulated by a quadrature amplitude modulation system.

3. A control method of a data transmitting apparatus for transmitting and receiving digitally modulated information data through a transmission path, comprising the steps of:
   receiving a transmission signal by one of a plurality of receiving antennas;
   selecting an appropriate one of said plurality of receiving antennas in accordance with a state change of said transmission path during the reception of said transmission signal; and
   soft-switching said receiving antennas from said one receiving antenna to said selected receiving antenna in a manner such that when said transmission signal is supplied from said receiving antenna to a reception demodulating unit, a signal level of said transmission signal is continuously shifted from said one receiving antenna to said selected receiving antenna over a predetermined time,
   wherein said reception demodulating unit has an automatic receiving-frequency-characteristics equalizing function, and said predetermined time is longer than the time that is necessary for processing said automatic equalizing function.

4. A control method of a data transmitting apparatus for transmitting and receiving digitally modulated information data through a transmission path, comprising the steps of:
   receiving a transmission signal by one of a plurality of receiving antennas;
   selecting an appropriate one of said plurality of receiving antennas in accordance with a state change of said transmission path during the reception of said transmission signal; and
   soft-switching said receiving antennas from said one receiving antenna to said selected receiving antenna in a manner such that when said transmission signal is supplied from said receiving antenna to a reception demodulating unit, a signal level of said transmission signal is continuously shifted from said one receiving antenna to said selected receiving antenna over a predetermined time,
   wherein said information data is modulated by a quadrature amplitude modulation system.

5. A control method of a data transmitting apparatus for transmitting and receiving digitally modulated information data through a transmission path, comprising the steps of:
   supplying a transmission signal to one of a plurality of transmitting antennas and transmitting said transmission signal;
   selecting an appropriate one of said plurality of transmitting antennas in accordance with a state change of said transmission path during the transmission of said transmission signal;
   soft-switching the transmitting antennas from said one transmitting antenna to said selected antenna so as to continuously shift a level of said transmission signal from said one transmitting antenna to said selected transmitting antenna over a predetermined time;
   receiving said transmission signal by one of a plurality of receiving antennas;
   selecting an appropriate one of said plurality of receiving antennas in accordance with a state change of said transmission path during the reception of said transmission signal; and
   soft-switching said receiving antennas from said one receiving antenna to said selected receiving antenna in a manner such that when said transmission signal is supplied from said receiving antenna to a reception demodulating unit, a signal level of said transmission signal is continuously shifted from said one receiving antenna to said selected receiving antenna over a predetermined time.

6. A method according to claim 5, wherein said step of soft-switching comprises the steps of:

supplying said transmission signal from said one receiving antenna to said reception demodulating unit in a continuously decreasing manner over a predetermined time; and supplying said transmission signal from said selected receiving antenna to said reception demodulating in a continuously increasing manner.

7. A method according to claim 5, wherein said reception demodulating unit has an automatic receiving-frequency-characteristics equalizing function, and said predetermined time is longer than the time that is necessary for processing said automatic equalizing function.

8. A method according to claim 5, wherein said information data is modulated by a quadrature amplitude modulation system.

9. A data transmitting apparatus for transmitting and receiving digitally modulated information data through a transmission path, comprising:

a transmitting apparatus including a transmission modulating unit, a switching unit for switching an output of said transmission modulating unit to an appropriate one of a plurality of transmission paths in accordance with a state change of said transmission path, a switching control unit for controlling said switching unit, and a plurality of transmitting antennas which receive outputs from said switching unit and are connected to said plurality of transmission paths, respectively; and a receiving apparatus having a receiving antenna and a reception demodulating unit with an automatic receiving-frequency equalizing function which receives an output of said receiving antenna, wherein said switching unit includes a path soft switching unit for switching said transmission paths from the path before switching to the path after switching in a manner such that a transmitting level of a transmission signal is continuously shifted from the path before switching to the path after switching over a predetermined time and a soft control unit for generating a control signal to said soft switching unit, and wherein said predetermined time is longer than the time that is necessary for processing said automatic receiving frequency-characteristics equalizing function.

10. A data transmitting apparatus for transmitting and receiving digitally modulated information data through a transmission path, comprising:

a transmitting apparatus including a transmission modulating unit, a switching unit for switching an output of said transmission modulating unit to an appropriate one of a plurality of transmission paths in accordance with a state change of said transmission path, a switching control unit for controlling said switching unit, and a plurality of transmitting antennas which receive outputs from said switching unit and are connected to said plurality of transmission paths, respectively; and a receiving apparatus having a receiving antenna and a reception demodulating unit with an automatic receiving-frequency equalizing function which receives an output of said living antenna, wherein said switching unit includes a path soft switching unit for switching said transmission paths from the path before switching to the path after switching in a manner such that a transmitting level of a transmission signal is continuously shifted from the path before switching to the path after switching over a predetermined time and a soft control unit for generating a control signal to said soft switching unit, and wherein said information data is modulated by a quadrature amplitude modulation system.

11. A data transmitting apparatus for transmitting and receiving digitally modulated information data through a transmission path, comprising:

transmitting apparatus; and a receiving apparatus including a plurality of receiving antennas, a selecting unit for selecting one of output paths from said plurality of receiving antennas in accordance with a state change of said transmission path, a selection control unit for controlling said selecting unit, and a reception demodulating unit with an automatic receiving-frequency-characteristics equalizing function which receives an output from said selecting unit, wherein said selecting unit includes a path soft selecting unit for selecting a receiving antenna output path in a manner such that when a received reception on signal is supplied to said reception demodulating unit, a level of said reception signal is continuously shifted from the receiving antenna output path before selection to the receiving antenna path after selection over a predetermined time, and a soft control unit for getting a control signal for said soft selecting unit in response to said selection control unit, and wherein said predetermined time is longer than the time that is necessary for processing said automatic receiving frequency-characteristics equalizing function.

12. A data transmitting apparatus for transmitting and receiving digitally modulated information data through a transmission path, comprising:

a transmitting apparatus; and a receiving apparatus including a plurality of receiving antennas, a selecting unit for selecting one of output paths from said plurality of receiving antennas in accordance with a state change of said transmission path, a selection control unit for controlling said selecting unit, and a reception demodulating unit with an automatic receiving-frequency-characteristics equalizing function which receives an output from said selecting unit, wherein said selecting unit includes a path soft selecting unit for selecting a receiving antenna output path in a manner such that when a received reception signal is supplied to said reception demodulating unit, a level of said reception signal is continuously shifted from the receiving antenna output path before selection to the receiving antenna path after selection over a predetermined time, and a soft control unit for generating a control signal for said soft selecting unit in response to said selection control unit, and wherein said information data is modulated by a quadrature amplitude modulation system.

13. A data transmitting apparatus for transmitting and receiving digitally modulated information data through a transmission path, comprising:

a transmitting apparatus; and a receiving apparatus including a plurality of receiving antennas, a selecting unit for selecting one of output paths from said plurality of receiving antennas in accordance with a state change of said transmission path, a selection control unit for controlling said selecting unit, and a reception demodulating unit with an automatic receiving-frequency-characteristics equalizing function which receives an output from said selecting unit, wherein said selecting unit includes a path soft selecting unit for selecting a receiving antenna output path in a manner such that when a received reception signal is supplied to said reception demodulating unit, a level of said reception signal is continuously shifted from the receiving antenna output path before selection to the receiving antenna path after selection over a predetermined time, and a soft control unit for generating a control signal for said soft selecting unit in response to said selection control unit, wherein said transmitting apparatus includes a transmission modulating unit, a switching unit for switching an output of said transmission modulating unit to an appropriate one of a plurality of transmission paths in accordance with a state change of said transmission path, a switching control unit for controlling said switching unit, and a plurality of transmitting antennas which receive outputs from said switching unit and are connected to said plurality of transmission paths, respectively, and wherein said switching unit includes a path soft switching unit for switching said transmission paths from the path before switching to the path after switching in a manner such that a transmitting level of a transmission signal is continuously shifted from the path before switching to the path after switching over a predetermined time and a soft control unit for generating a control signal to said soft switching unit.

14. An apparatus according to claim 13, wherein said path soft switching unit continuously decreases and increases the output of said transmission modulating unit which passes through said path before switching and said path after switching over said predetermined time, respectively.

15. An apparatus according to claim 13, wherein said predetermined time is longer than the time that is necessary for processing said automatic receiving-frequency-characteristics equalizing function.

16. An apparatus according to claim 13, wherein said information data is modulated by a quadrature amplitude modulation system.

17. A control method of a data transmitting apparatus for transmitting and receiving digitally modulated information data through a transmission path, comprising the steps of:

supplying a transmission signal to one of a plurality of transmitting antennas and transmitting said transmission signal;

selecting an appropriate one of said plurality of transmitting antennas in accordance with a state change of said transmission path during the transmission of said transmission signal; and soft-switching the transmitting antennas from said one transmitting antenna to said selected antenna so as to continuously shift a level of said transmission signal from said one transmitting antenna to said selected transmitting antenna over a predetermined time, wherein said information data is modulated by an 8-VSB system.

18. A control method of a data transmitting apparatus for transmitting and receiving digitally modulated information data through a transmission path, comprising the steps of:

supplying a transmission signal to one of a plurality of transmitting antennas and transmitting said transmission signal;

selecting an appropriate one of said plurality of transmitting antennas in accordance with a state change of said transmission path during the transmission of said transmission signal; and soft-switching the transmitting antennas from said one transmitting antenna to said selected antenna so as to continuously shift a level of said transmission signal from said one transmitting antenna to said selected transmitting antenna over a predetermined time, wherein said information data is modulated by a multiple level-FM.

19. A control method of a data transmitting apparatus for transmitting and receiving digitally modulated information data through a transmission path, comprising the steps of:

receiving a transmission signal by one of a plurality of receiving antennas;

selecting an appropriate one of said plurality of receiving antennas in accordance with a state change of said transmission path during the reception of said transmission signal;

soft-switching said receiving antennas from said one receiving antenna to said selected receiving antenna in a manner such that when said transmission signal is supplied from said receiving antenna to a reception demodulating unit, a signal level of said transmission signal is continuously shifted from said one receiving antenna to said selected receiving antenna over a predetermined time, wherein said information data is modulated by an 8-VSB system.

20. A control method of a data transmitting apparatus for transmitting and receiving digitally modulated information data through a transmission path, comprising the steps of:

receiving a transmission signal by one of a plurality of receiving antennas;

selecting an appropriate one of said plurality of receiving antennas in accordance with a state change of said transmission path during the reception of said transmission signal;

soft-switching said receiving antennas from said one receiving antenna to said selected receiving antenna in a manner such that when said transmission signal is supplied from said receiving antenna to a reception demodulating unit, a signal level of said transmission signal is continuously shifted from said one receiving antenna to said selected receiving antenna over a predetermined time, wherein said information data is modulated by a multiple level-FM.

21. A data transmitting apparatus for transmitting and receiving digitally modulated information data through a transmission path, comprising:

a transmitting apparatus including a transmission modulating unit, a switching unit for switching an output of said transmission modulating unit to an appropriate one of a plurality of transmission paths in accordance with a state change of said transmission path, a switching control unit for controlling said switching unit, and a plurality of transmitting antennas which receive outputs from said switching unit and are connected to said plurality of transmission paths, respectively; and a receiving apparatus having a receiving antenna and a reception demodulating unit with an automatic receiving-frequency equalizing function which receives an output of said receiving antenna, wherein said switching unit includes a path soft switching unit for switching said transmission paths from the path before switching to the path after switching in a manner such that a transmitting level of a transmission signal is continuously shifted from the path before switching to the path after switching over a predetermined time and a soft control unit for generating a control signal to said soft switching unit, and wherein said information data is modulated by an 8-VSB system.

22. A data transmitting apparatus for transmitting and receiving digitally modulated information data through a transmission path, comprising:

a transmitting apparatus including a transmission modulating unit, a switching unit for switching an output of said transmission modulating unit to an appropriate one of a plurality of transmission paths in accordance with a state change of said transmission path, a switching control unit for controlling said switching unit, and a plurality of transmitting antennas which receive outputs from said switching unit and are connected to said plurality of transmission paths, respectively; and a receiving apparatus having a receiving antenna and a reception demodulating unit with an automatic receiving-frequency equalizing function which receives an output of said receiving antenna, wherein said switching unit includes a path soft switching unit for switching said transmission paths from the path before switching to the path after switching in a manner such that a transmitting level of a transmission signal is continuously shifted from the path before switching to the path after switching over a predetermined time and a soft control unit for generating a control signal to said soft switching unit, and wherein said information data is modulated by a multiple level-FM.

23. A data transmitting apparatus for transmitting and receiving digitally modulated information data through a transmission path, comprising:

a transmitting apparatus; and a receiving apparatus including a plurality of receiving antennas, a selecting unit for selecting one of output paths from said plurality of receiving antennas in accordance with a state change of said transmission path, a selection control unit for controlling said selecting unit, and a reception demodulating unit with an automatic receiving-frequency-characteristics equalizing function which receives an output from said selecting unit, wherein said selecting unit includes a path soft selecting unit for selecting a receiving antenna output path in a manner such that when a received reception signal is supplied to said reception demodulating unit, a level of said reception signal is continuously shifted from the receiving antenna output path before selection to the receiving antenna path after selection over a predetermined time, and a soft control unit for generating a control signal for said soft selecting unit in response to said selection control unit, and wherein said information data is modulated by an 8-VSB system.

24. A data transmitting apparatus for transmitting and receiving digitally modulated information data through a transmission path, comprising:

a transmitting apparatus; and a receiving apparatus including a plurality of receiving antennas, a selecting unit for selecting one of output paths from said plurality of receiving antennas in accordance with a state change of said transmission path, a selection control unit for controlling said selecting unit, and a reception demodulating unit with an automatic receiving-frequency-characteristics equalizing function which receives an output from said selecting unit, wherein said selecting unit includes a path soft selecting unit for selecting a receiving antenna output path in a manner such that when a received reception signal is supplied to said reception demodulating unit, a level of said reception signal is continuously shifted from the receiving antenna output path before selection to the receiving antenna path after selection over a predetermined time, and a soft control unit for generating a control signal for said soft selecting unit in response to said selection control unit, and wherein said information data is modulated by a multiple level-FM.

* * * * *